United States Patent
Frosch

[11] 4,129,357
[45] Dec. 12, 1978

[54] PARTIAL POLARIZER FILTER

[76] Inventors: Robert A. Frosch, Administrator of the National Aeronautics and Space Administration, with respect to an invention of Alan M. Title, Palo Alto, Calif.

[21] Appl. No.: 823,566

[22] Filed: Aug. 11, 1977

[51] Int. Cl.² .......................... G02B 1/02; G02B 5/20
[52] U.S. Cl. ................................................... 350/157
[58] Field of Search .................................. 356/147, 157

[56] References Cited

PUBLICATIONS

Harris et al., "Optical Network Synthesis Using Birefringent Crystals"; J. Optical Soc. Am.; vol. 54, p. 1267 (Oct. 1964).
Title; "Improvement in Birefringent Filters", Applied Optics; vol. 15, p. 2871 (Nov. 1976).

*Primary Examiner*—John K. Corbin
*Assistant Examiner*—R. A. Rosenberger
*Attorney, Agent, or Firm*—Robert D. Marchant; John R. Manning; John O. Tresansky

[57] ABSTRACT

A birefringent filter module comprises, in seriatum, an entrance polarizer, a first birefringent crystal responsive to optical energy exiting the entrance polarizer, a partial polarizer responsive to optical energy exiting the first polarizer, a second birefringent crystal responsive to optical energy exiting the partial polarizer, and an exit polarizer. The first and second birefringent crystals have fast axes disposed ± 45° from the high transmitivity direction of the partial polarizer. Preferably, the second crystal has a length ½ that of the first crystal and the high transmitivity direction of the partial polarizer is nine times as great as the low transmitivity direction. To provide tuning, the polarizations of the energy entering the first crystal and leaving the second crystal are varied by either rotating the entrance and exit polarizers, or by sandwiching the entrance and exit polarizers between pairs of half wave plates that are rotated relative to the polarizers. A plurality of the filter modules may be cascaded. The first crystal for module (n+1) is 2/3 of the length of the second crystal of module n.

20 Claims, 3 Drawing Figures

PARTIAL POLARIZER FILTER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457), and may be manufactured and used by or for the Government for governmental purposes without the payment of any royalties thereon or therefor.

BACKGROUND OF THE INVENTION

The present invention relates generally to optical, birefringent filters, and more particularly to a birefringent filter including a pair of birefringent crystals of differing lengths, between which is sandwiched a partial polarizer.

One type of prior art birefringent filter module includes similarly aligned, perfect, entrance and exit polarizers, between which is located a birefringent crystal having fast and slow orthogonal axes. The entrance and exit polarizers are rotatable together relative to the birefringent crystal to provide tuning. In response to an optical energy pulse impinging on the entrance polarizer, a pair of output pulses having spaced occurrence times are derived. The spacing between the output pulses is dependent upon the difference in the indices of refraction of the fast and slow axes of the crystal, the length of the crystal, and the speed of light in vacuum. A number of these modules have been cascade together, whereby successive modules include birefringent crystals having lengths related to each other in a geometric progression relative to the length of the module having the longest crystal. Such a birefringent crystal arrangement is frequently referred to as a Lyot filter.

A problem with the prior art Lyot filter is that the amplitude versus output frequency response of the filter includes many secondary maxima of significant amplitude. Thereby, if it is desired for the filter to handle a wide band pass, there is a tendency for significant energy outside of the desired band pass to be passed through the filter, to produce deleterious effects.

SUMMARY OF THE INVENTION

In accordance with a broad aspect of the present invention, a birefringent filter module for optical energy propagating along an optical axis includes entrance and exit polarizers having common polarization directions in a plane at right angles to an optical axis along which the optical energy is propagating. A first birefringent crystal responds to optical energy exiting from the entrance polarizer. The first crystal has a fast and slow axes respectively displaced $\pm 45°$ from a first polarization direction in a plane normal to the optical axis. A partial polarizer responsive to optical energy exiting the first crystal has orthogonal high and low transmitivity directions in the normal plane, with the high transmitivity direction being in the first direction. A second birefringent crystal responsive to optical energy exiting from the partial polarizer has its fast axis displaced $90°$ from the fast axis of the first crystal in the normal plane. To minimize secondary maxima, the transmitivity and relative lengths of the two crystals are appropriately selected. In one preferred embodiment, there are minimum secondary maxima by making the first crystal twice as long as the second crystal, and the transmitivity of the partial polarizer is nine times as great in the high transmitivity direction as in the low transmitivity direction.

To tune the crystal, the polarizations of the energy entering the first crystal and leaving the second crystal are rotated. In one embodiment, the entrance and exit polarizers are rotated together about the optical axis relative to the first and second crystals and the partial polarizer. In a second embodiment, two pairs of half wave rotatable plates are provided. The entrance polarizer is sandwiched between one pair of the half wave plates, while the exit polarizer is sandwiched between the other pair of half wave plates. The entrance and exit polarizers are maintained stationary, so they can be easily removed, compared to the ease of removal of the rotatable half wave plates. This is desirable because of the relatively narrow bandwidth properties of polarizer plates relative to half wave plates.

To increase the separation between transmission band passes, a plurality of the filter modules are cascaded along the optical axis. In such a configuration, the first crystal for any downstream module $(n+1)$ has a length of ½ of the second crystal for the immediately preceding module, n, and the relative length of the first and second crystals of each of the modules is two to one. In the cascaded configuration, the exit polarizer for module n is the entrance polarizer for module $(n+1)$.

To enable the device to have a wide effective field of view, each crystal is formed as a Lyot wide field structure including two equal length birefringent segments between which is sandwiched a half wavelength plate. The birefringent crystal segments have fast axes polarized $\pm 45°$ relative to waves respectively entering and leaving the half wavelength plate and each has a length one half of the total length of the particular crystal.

While it has been analytically shown in the past that partial polarizers between a pair of birefringent equal length filters (having length L) do not have a deleterious effect on Lyot filter performance if the ratio of the polarized to unpolarized light is greater than $[(10\ n^2 - 1)/1]$, where n equals the number of intermediate polarizers, it has not been previously realized that advantageous results can be obtained relative to the Lyot filter if the birefringent crystals have differing lengths, with proper selection of the transmitivity of these fast and slow axes. Attempts to build systems employing partial polarizers have not been satisfactory. It is believed that one reason why the prior art attempts have failed is because ordinary partial polarizers are wave plates of differing fractional wavelength that cause rotation of the polarization direction of the incident optical energy. The wavelength of each partial polarizer, and hence the polarization rotation, differs from polarizer to polarizer. In accordance with another aspect of the present invention, the differing wave plate effect of the partial polarizers is overcome by attaching a compensation plate, of known configuration (such as a plastic film), to the partial polarizers so there is no effective polarization rotation by the partial polarizer.

It is, accordingly, an object of the present invention to provide a new and improved birefringent filter.

Another object of the present invention is to provide a birefringent filter having lower secondary maxima in the amplitude versus output frequency response of the filter.

A further object of the invention is to provide a new and improved tunable, relatively wide band optical filter.

Yet another object of the invention is to provide a new and improved optical filter including a plurality of cascaded modules having birefringent filters that are arranged to enable a plurality of different frequency lines within a predetermined band width to be derived.

The above and still further objects, features and advantages of the present invention will become apparent upon consideration of the following detailed description of several specific embodiments thereof, especially when taken in conjunction with the accompanying drawing.

DESCRIPTION OF THE PREFERRED EMBODIMENT

Figure 1:
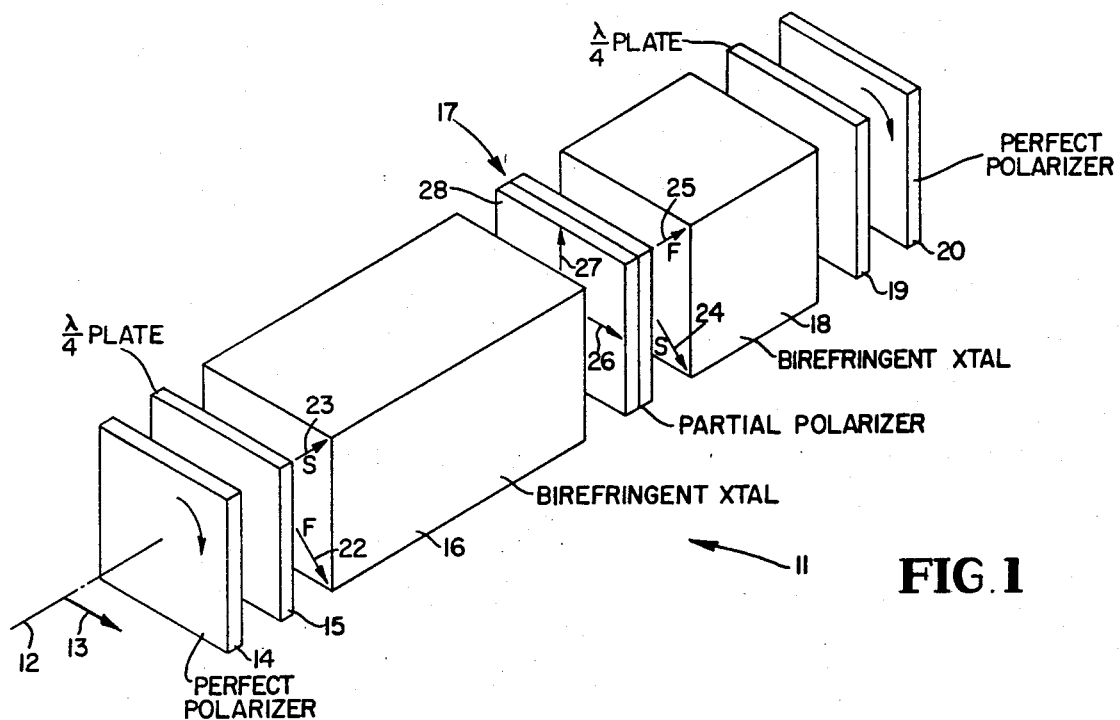
FIG. 1 is a perspective diagram of a single module in accordance with the invention.

Reference is now made to FIG. 1 of the drawing wherein one preferred embodiment of a birefringent filter module in accordance with the present invention is illustrated. Module 11 of FIG. 1 includes a number of optical elements having entrance and exit faces in planes normal to optical axis 12, along which an optical beam to be filtered is propagated. The beam entering module 11 is plane polarized, and enters the module from the lower left side thereof, as illustrated in FIG. 1. The beam emerges from module 11, as a plane polarized beam, having the same polarization direction as the incident beam, from the end of the module illustrated in the upper right hand corner. A beam entering and leaving module 11 that is polarized in the horizontal direction, as indicated by arrow 13, is considered to be polarized in a first or reference direction.

The elements of module 11 are, from the entrance to the exit, perfect polarizer 14, quarter wave plate 15, a first birefringent crystal 16, partial polarizer 17, a second birefringent crystal 18, quarter wave plate 19, and perfect polarizer 20. While each of the elements 14–20 is illustrated as being square in the planes normal to axis 12, it is to be understood that usually these elements are circular in the planes normal to axis 12; the elements are shown as being square in cross-section to facilitate the description.

To provide tuning, polarizers 14 and 20 are rotatable about axis 12, in planes normal to the axis, whereby the amplitudes of the optical energy respectively incident on an entrance face of quarter wave plate 15 and exiting from module 11 are varied. The remaining elements of module 11 are stationary relative to axis 12. Quarter wave plate 15 changes the linearly polarized light that is incident on it into elliptically polarized light having components that are determined by the relative polarization angles of the optical energy incident on polarizer 14 and the polarization axis or direction of polarizer 14. Conversely, quarter wave plate 19 changes elliptically polarized light that emerges from birefringent crystal 18 into linearly polarized light that is selectively passed through polarizer 20, depending upon the polarization directions of the light emerging from plate 19 and the polarization direction of polarizer 20.

Birefringent crystals 16 and 18 have slow and fast axes that are mutually orthogonal to each other and differing lengths. The lengths of crystals 16 and 18 and the transmitivities of the high and low polarization directions of partial polarizer 17 are selected to provide minimum secondary maxima for the wavelengths emerging from module 11. Crystal 16 has a length that is dependent on the region in the optical spectrum of the optical energy propagating along axis 12, and which is to be filtered by module 11. Fast and slow axes 22 and 23 of crystal 16 are respectively displaced, in the normal plane, by ±45° from direction 13. In an opposite sense, the slow and fast axes 24 and 25 of crystal 18 are displaced, in the normal plane, ±45° from direction 13. Partial polarizer 17 is arranged so that it has high and low transmitivity directions in the normal plane, respectively aligned with and orthogonal to direction 13, as indicated by arrows 26 and 27.

In a preferred embodiment, to minimize secondary maxima, crystal 16 has a length, along axis 12, twice the length of crystal 18 and the transmitivity of partial polarizer 17 along axis 26 is nine times as great as the transmitivity of the partial polarizer along axis 27. The effectiveness of the module illustrated in FIG. 1 can be realized by considering the transmitivity response as a function of wavelength relative to the wavelength of crystal 16, if it is assumed that a normalized transmitivity of 1.00 is derived from perfect polarizer 20 when the optical energy incident on quarter wave plate 15 has a wave length that causes crystal 16 to be tuned. A first secondary maximum, having a transmitivity of approximately 0.18% of the transmitivity for the tuned condition, occurs at a wavelength that is approximately 1.4 times the full width at half maximum removed from the tuned wavelength. A second secondary maximum, having an amplitude of approximately 0.394% of the normalized transmitivity occurs for a wavelength that is approximately 3.5 times the full width at half maximum removed from the tuned wavelength, while a third secondary maximum has a transmitivity of approximately 0.08% at a wavelength that is displaced from the tuned wavelength by approximately 5 times the full width at half maximum. At wavelengths removed by more than 5 times the full width at half maximum removed from the tuned wavelength, all secondary maxima are virtually suppressed.

In contrast, if a perfect polarizer is employed between birefringent crystals 16 and 18, the secondary maxima have progressively decreasing amplitudes. The first secondary maximum, displaced from the tuned condition by 1.5 times the full width at half maximum of the tuned frequency, has an amplitude that is 4.3% of the normalized amplitude for the tuned condition. The second secondary maximum, at a wavelength 2.5 times the full width at half maximum removed from the tuned wavelength, has an amplitude of 1.6% of the normalized amplitude. The third secondary maximum, at a wavelength 3.5 times the full width at half maximum displaced from the tuned wavelength, has an amplitude of approximately 0.8% of the tuned amplitude; the fourth secondary maximum, at 4.5 times the full width at half maximum wavelength, has an amplitude of approximately 0.5% of the normalized amplitude; and the fifth secondary maximum, at a wavelength of 5.5 times the full width at half maximum of the tuned frequency wavelength, has an amplitude of 0.3% of the normalized amplitude. It is thus apparent that the total secondary energy passing through a filter in accordance with the present invention is considerably less than in the prior art situation wherein a perfect polarizer is employed and that better filtering close to the tuned wavelength is provided.

To enable module 11 to function effectively to achieve the aforementioned results, it is necessary for no effective polarization rotation to be introduced by partial polarizer 17. It has been found, however, that partial polarizers do cause rotation of the polarization direction of optical energy incident thereon. It has also been found that the wavelength of each partial polarizer, and hence the amount of polarization rotation, differs from polarizer to polarizer. To compensate for the variable polarization rotation introduced by partial polarizer 17, the polarizer is provided with a compensating plate 28, in the form of a plastic film that is attached to a face of the partial polarizer in the normal plane. Film 28 has a thickness to compensate for the polarization rotation by partial polarizer 17, whereby the energy exiting the partial polarizer is polarized in the same direction as the energy incident on the partial polarizer and there is no effective polarization rotation by the partial polarizer. The thickness of film 28 must be determined separately for each partial polarizer 17 on an empirical basis.

Figure 2:
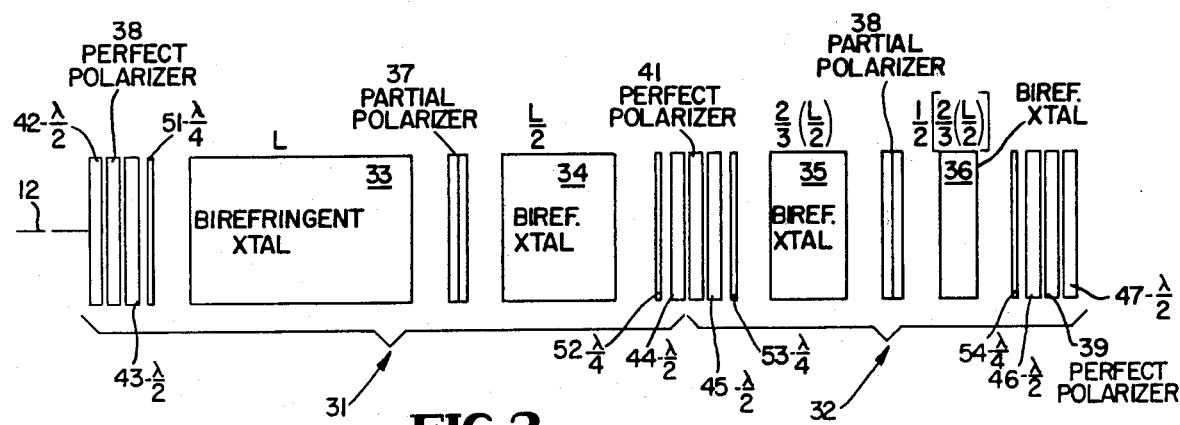
FIG. 2 is a schematic diagram indicating how a number of the modules are cascaded together.

Reference is now made to FIG. 2 of the drawing wherein there is illustrated a filter including two cascaded modules 31 and 32, each of which is generally similar to module 11, FIG. 1. Modules 31 and 32 are cascaded together to increase the wavelength separation between passed wavelengths. Each of modules 31 and 32 includes a pair of birefringent crystals, between which is sandwiched a partial polarizer; the birefringent crystals of module 31 are indicated by reference numerals 33 and 34, while the birefringent crystals of module 32 are indicated by reference numerals 35 and 36; the partial polarizers of modules 31 and 32 are respectively indicated by reference numerals 37 and 38. The axes and lengths of crystals 33-36 and partial polarizers 37 and 38 of modules 31 and 32 are determined in accordance with the same criteria as described supra in connection with module 11. Thus, crystal 34 is ½ as long as crystal 33, and crystal 36 is ½ as long as crystal 35. The high transmitivity directions of partial polarizers 37 and 38 are aligned, as are the fast axes of crystals 33 and 35, which in turn are aligned with the slow axes of crystals 34 and 36, at an angle displaced 45° from the high transmitivity directions of crystals 37 and 38.

To minimize the secondary maxima, the length of first crystal 35 in downstream module 32 is ⅓ the length of the second (downstream) crystal of module 31. Hence, if the length of crystal 33 is L, the lengths of crystals 34, 35 and 36 are respectively L/2, L/3 [=⅔(½)] and L/6[=½(⅓) (L/2) ].

Variable tuning is performed with the filter of FIG. 2 by utilizing stationary, rather than rotatable, perfect polarizers at the entrance and exit of each of modules 31 and 32. Tuning is performed by sandwiching each of the perfect polarizers between a pair of half wave plates. In particular, stationary, perfect polarizers 38 and 39 are respectively provided upstream and downstream of crystals 33 and 36 of modules 31 and 32. The exit of module 31 and entrance to module 32 share a common perfect polarizer 41. Polarizer 38 is sandwiched between half wave plates 42 and 43; perfect polarizer 41 is sandwiched between half wave plates 44 and 45; perfect polarizer 39 is sandwiched between half wave plates 46 and 47. Half wave plates 42-47 are rotatable about the optical axis in the normal plane by suitable motors (not shown) which rotate the half wave plates to provide a desired center wavelength for the optical energy passed by the filter. The advantage of using half wave plates as rotatable elements and of employing stationary perfect polarizers is that the polarizers are frequency dependent and therefore require removal as different wavelength bands are filtered by the apparatus. Of course, it is difficult to remove elements that are mounted for rotation compared to the ease with which stationary members may be removed from a housing.

The cascaded modular configuration of FIG. 2 is similar to that of FIG. 1, because quarter wave plates 51-54 are located immediately upstream and downstream of the first and second birefringent crystals of each module. Hence, plates 51 and 52 are respectively located immediately in front of the entrance face of crystal 33 and behind the exit face of crystal 34, while quarter wave plates 53 and 54 are respectively immediately upstream of the entrance face of crystal 35 and downstream of the exit face of crystal 36. The quarter wave plates convert linearly polarized waves into optically polarized waves and vice versa, depending upon whether the quarter wave plates are upstream or downstream of the birefringent crystals.

It is to be understood that a number of modules can be cascaded together, similar to the manner in which modules 31 and 32 are cascaded together in FIG. 2. The first crystal of any module (n+1) downstream of a module n has a length that is ⅓ of the length of the second crystal of module n, to achieve minimum amplitude secondary maxima. For all modules, except the first and last modules, there is an intermediate perfect polarizer that is shared by adjacent modules.

Figure 3:
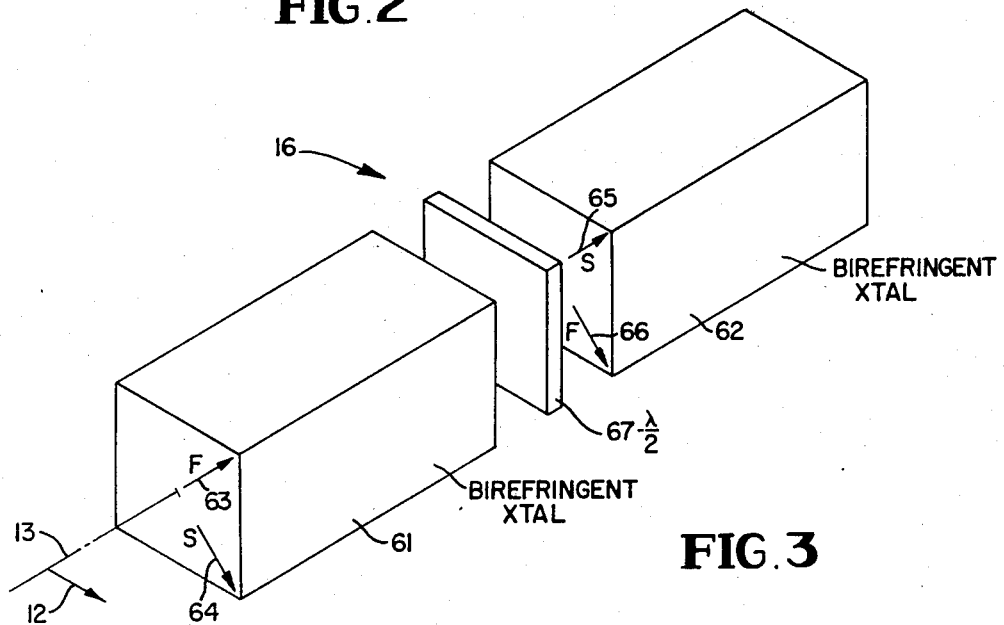
FIG. 3 is a schematic diagram of a modified portion of the device illustrated in FIG. 2.

To increase the effective field of view, the birefringent crystal of each module can be formed as a Lyot filter, as illustrated in FIG. 3, wherein a preferred configuration for birefringent filter 16 is illustrated. Filter 16 includes two birefringent segments having orthogonal fast and slow axes 63-66 in planes normal to optical axis 13. Each of crystal segments 61 and 62 has a length ½ of the length of crystals 16, as required for tuning. Sandwiched between segments 61 and 62 is half wave plate 67, which is not considered to contribute to the length of crystal 16 for tuning purposes.

In one actual configuration, a four module, 8 crystal filter has been built using Polaroid NH-38 for the perfect polarizers. The largest crystal of the filter is 79.312 mm in length. At a wavelength of 5324 Å, the filter has a full width at half maximum of 0.09 Å. A theoretical discussion of the device is found in the November, 1976 issue of Applied Optics, pages 2871-2878, in an article written by the inventor.

While there have been described and illustrated several specific embodiments of the invention, it will be clear that variations in the details of the embodiment specifically illustrated and described may be made without departing from the true spirit and scope of the invention as defined in the appended claims.

What is claimed is:

1. A birefringent filter module for optical energy propagating along an optical axis comprising an entrance polarizer, said entrance polarizer being polarized in a plane normal to the optical axis, a first birefringent crystal responsive to optical energy exiting the entrance polarizer, said first crystal having a fast axis displaced 45° from a first polarization direction in the plane normal, a partial polarizer responsive to optical energy exiting the first crystal, said partial polarizer having orthogonal high and low transmitivity directions, the high transmitivity direction being in the first direction, a second birefringent crystal responsive to optical energy exiting the partial polarizer, said second crystal having a fast axis displaced 90° from the fast axis of the first crystal in the normal plane, and an exit polarizer, said exit polarizer being polarized in the normal plane, the lengths of the first and second crystals differing from each other.

2. The module of claim 1 wherein one of the crystals has a length twice that of the other crystal.

3. The module of claim 1 further including compensating means on the partial polarizer for compensating the tendency of the partial polarizer to rotate the polarization direction of optical energy incident thereon so that optical energy entering and leaving the partial polarizer has the same polarization direction.

4. The module of claim 2 further including compensating means on the partial polarizer for compensating the tendency of the partial polarizer to rotate the polarization direction of optical energy incident thereon so that optical energy entering and leaving the partial polarizer has the same polarization direction.

5. The module of claim 1 wherein the transmitivity of the partial polarizer is 9 times as great in the high transmitivity direction as in the low transmitivity direction.

6. The module of claim 5 wherein one of the crystals has a length twice that of the other crystal.

7. The module of claim 6 further including compensating means on the partial polarizer for compensating the tendency of the partial polarizer to rotate the polarization direction of optical energy incident thereon so that optical energy entering and leaving the partial polarizer has the same polarization direction.

8. The module of claim 1 further including means for rotating the polarizations of the energy entering the first crystal and leaving the second crystal relative to the crystals and the partial polarizer.

9. The module of claim 8 wherein the means for rotating includes means for rotating the entrance and exit polarizers relative to the first and second crystals and the partial polarizer.

10. The module of claim 9 further including compensating means on the partial polarizer for compensating the tendency of the partial polarizer to rotate the polarization direction of optical energy incident thereon so that optical energy entering and leaving the partial polarizer has the same polarization direction.

11. The module of claim 8 wherein the means for rotating includes a first pair of ¼ wave plates between which said entrance polarizer is sandwiched, and a second pair of ¼ wave plates between which said exit polarizer is sandwiched, and means for rotating said first and second pairs of ¼ wave plates relative to each of the entrance and exit polarizers, the first and second crystals and the partial polarizer.

12. The module of claim 1 wherein a plurality of the filter modules defined in claim 1 are cascaded along the optical axis, the relative lengths of the first and second crystals of each of said modules being 2:1, the exit polarizer for module n being the entrance polarizer for module (n+1), the first crystal for module (n+1) having a length of ½ of the second crystal for module n.

13. The module of claim 12 wherein the transmitivity of each partial polarizer is 9 times as great in the high transmitivity direction as in the low transmitivity direction.

14. The module of claim 13 further including means for rotating the polarizations of the energy entering the first crystal and leaving the second crystal relative to the crystals and the partial polarizers.

15. The module of claim 14 further including compensating means on the partial polarizer for compensating the tendency of the partial polarizer to rotate the polarization direction of optical energy incident thereon so that optical energy entering and leaving the partial polarizer has the same polarization direction.

16. The module of claim 12 further including means for rotating the polarizations of the energy entering the first crystal and leaving the second crystal relative to the crystals and the partial polarizers.

17. The module of claim 1 wherein the first and second crystals are wide field of view structures and each structure comprises in cascade along the optical axis a first birefringent crystal segment having a length one half the length of the crystal of the structure and a fast axis displaced 45° from the first direction in the normal plane, a half wave plate having an axis in the first direction in the normal plane, a second birefringent crystal segment having a length one half the length of the crystal of the structure and a fast axis displaced 90° from the fast axis of the first crystal segment in the normal plane.

18. The module of claim 17 wherein each structure further includes a quarter wave plate having an axis along the first direction, in the normal plane, the quarter wave plate in the structure downstream of the entrance polarizer in the module being upstream of the first crystal segment of the structure and downstream of the entrance polarizer of the module, the quarter wave plate in the structure upstream of the exit polarizer in the module being downstream of the second crystal segment of the structure and upstream of the exit polarizer of the module.

19. The module of claim 18 further including a first half wave plate downstream of the entrance polarizer and upstream of the first crystal, a second half wave plate upstream of the exit polarizer and downstream of the second crystal.

20. The module of claim 19 further including compensating means on the partial polarizer for compensating the tendency of the partial polarizer to rotate the polarization direction of optical energy incident thereon so that optical energy entering and leaving the partial polarizer has the same polarization direction.

* * * * *